I. F. BOBO.
SAW SET.
APPLICATION FILED APR. 8, 1919.

1,321,359.

Patented Nov. 11, 1919.
2 SHEETS—SHEET 1.

Witness
Wm C. Dashiell

Inventor
I. F. Bobo
By David P. Moore
Attorney

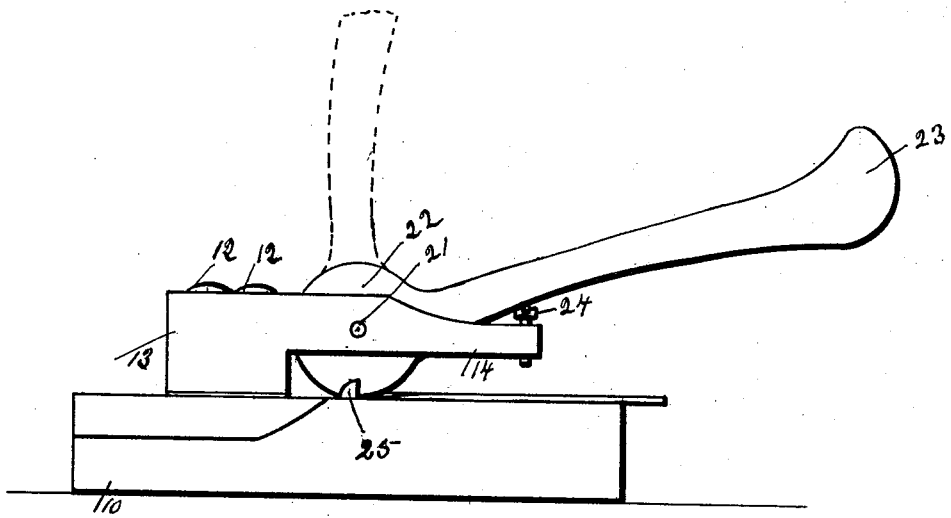
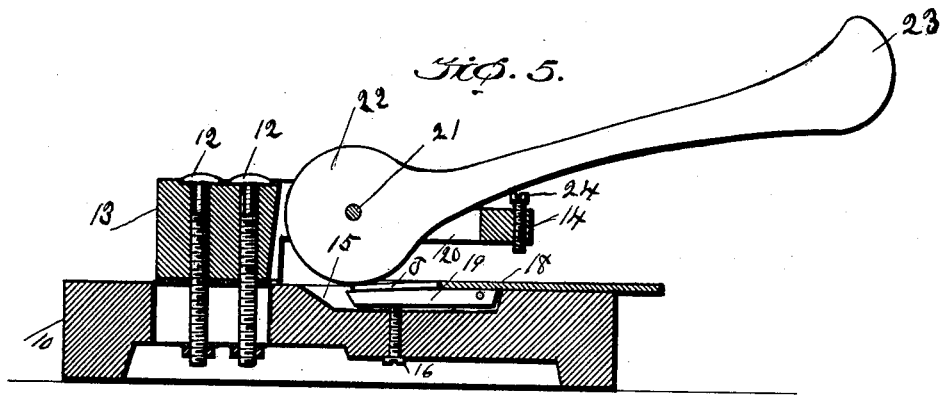

UNITED STATES PATENT OFFICE.

ISAAC F. BOBO, OF LYNCHBURG, TENNESSEE.

SAW-SET.

1,321,359.  Specification of Letters Patent.  Patented Nov. 11, 1919.

Application filed April 8, 1919. Serial No. 288,509.

*To all whom it may concern:*

Be it known that I, ISAAC F. BOBO, a citizen of the United States, residing at Lynchburg, in the county of Moore and State of Tennessee, have invented certain new and useful Improvements in Saw-Sets, of which the following is a specification, reference being had therein to the accompanying drawing.

This invention relates to improvements in saw sets, one object of the invention being the provision of a device especially designed for setting saw teeth without fracturing or breaking the metal and which is adjustable so as to permit of any desired angle to the set.

A further object of this invention is the provision of a device of this character which permits of the proper introduction of the saw teeth so that each tooth may be acted upon and the exact angle of setting be imparted to all teeth without in any way affecting the temper or fracturing the metal of the tooth at its junction with the blade.

A still further object of this invention is the provision of a saw set which is simple, durable and inexpensive in construction and thoroughly efficient and practical in use.

In the accompanying drawings:

Fig. 4 is a side elevation of the complete set.

Fig. 5 is a vertical central sectional view of the complete set with the saw in the position when being acted upon.

Figure 1:
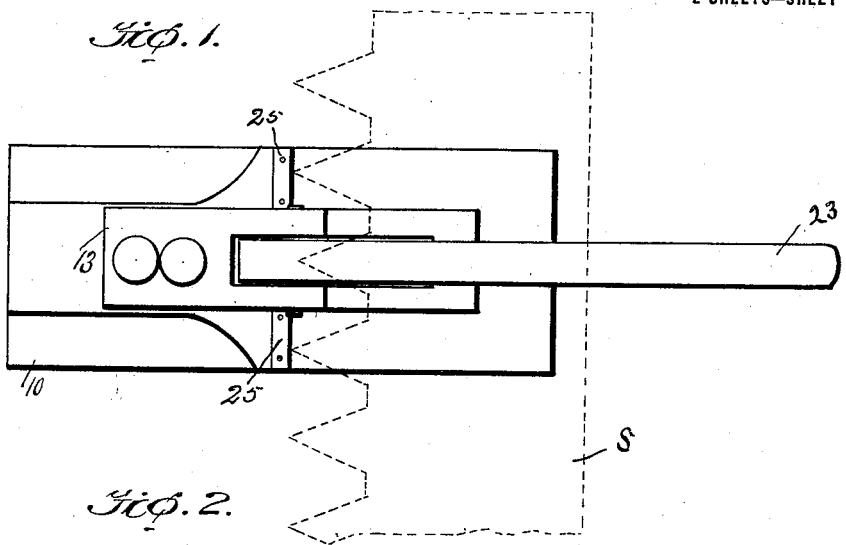
Figure 1 is a top plan view of the complete saw set, dotted lines indicating the position of the saw therein.
Figure 2:
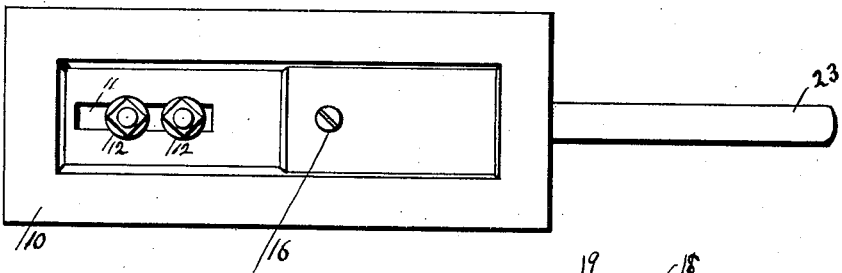
Fig. 2 is a bottom plan view thereof.
Figure 3:
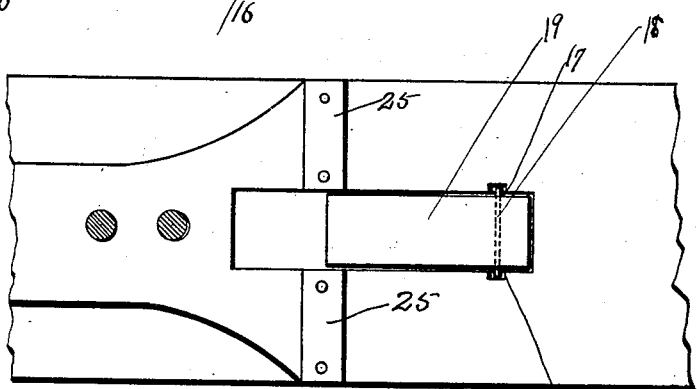
Fig. 3 is a horizontal section through the cam supporting member, showing the anvil in top plan view and the adjacent portion of the base.

Referring to the drawings, the numeral 10 designates the base which may be made in any shape or form and is provided with a longitudinal slot 11 for the reception of the adjusting screws or poles 12, which hold the standard 13 upon the base and permit the same to be longitudinally adjusted so as to regulate the position of the arm 14. Also formed in the base is a recess 15 for the adjusting screw 16 projecting from below and adjustable, the purpose of which will presently appear. This recess 15 is also provided at its forward end with the oppositely disposed slots 17 for the reception of the ends of the journaling pin 18 of the pivoted block or anvil 19.

It will be noted that the adjusting screw 16 engages the under side of the free end of this block or anvil so as to adjust the same and thus regulate the "set" to be imparted to the tooth T of the saw S, as clearly shown in Fig. 5.

Pivoted in the slot 20 of the arm 14 by means of the pin 21 is the eccentric cam 22 provided with the pulling handle 23, the cam being so disposed as to bear upon the upper surface of the tooth T and coöperate with the anvil 19 in setting the tooth, an adjusting screw 24 being mounted in the extreme end of the arm 14 so as to limit the upward movement of the handle 23 and consequently the cam action upon the tooth.

There is mounted upon the base 10 the fixed strips or guides 25 which prevent the too far introduction of the teeth of the saw into the machine.

From the foregoing description, it is evident that with a device constructed according to this invention that the set imparted to the saw tooth will be such as not to fracture the metal at the junction with the blade and that by the adjustment of the anvil and the adjusting of the cam, the desired set may be imparted.

What I claim as new is:

1. A saw set including a base, having a recess in the upper face thereof, an anvil pivoted in said recess at one end, adjustable means mounted in the base for limiting the movement of the free end of the anvil, and an adjustable hand operated cam mounted upon the base for coöperation with the anvil.

2. A saw set including a base having a recess in the upper face thereof, an anvil pivoted in said recess at one end, adjustable means mounted in the base for limiting the movement of the free end of the anvil, an adjustable arm mounted upon the base and having its free end above the recess of the base, a cam mounted in the free end of the arm for coöperation with the anvil, and adjustable means also mounted in the free end of the arm for limiting the movement of the cam.

3. A saw set including a base having a recess in the upper face thereof with oppositely disposed slots, an anvil, a pin carried by the anvil for seating in the slots so that the anvil is adjustable in the recess, an adjustable screw mounted in the base for limiting the movement of the free end of the anvil in the recess, a substantially L-shaped arm disposed longitudinally of and adjustably connected to the base, the free end of the arm being slotted and extending above the recess in the base, a hand operated cam mounted in the slotted arm and disposed for coöperation with the anvil, and an adjustable screw mounted in the free end of the arm for coöperating with the cam to limit the movement thereof.

In testimony whereof I affix my signature.

ISAAC F. BOBO.

Copies of this patent may be obtained for five cents each, by addressing the "Commissioner of Patents, Washington, D. C."